United States Patent
Zyuban et al.

(10) Patent No.: US 12,231,044 B2
(45) Date of Patent: Feb. 18, 2025

(54) POWER CONVERTER CIRCUIT FOR USE WITH MULTIPLE LOW-CURRENT POWER RAILS

(71) Applicant: Apple Inc., Cupertino, CA (US)

(72) Inventors: Victor Zyuban, Sunnyvale, CA (US); Jay B. Fletcher, Saratoga, CA (US); Hao Zhou, San Jose, CA (US)

(73) Assignee: Apple Inc., Cupertino, CA (US)

( * ) Notice: Subject to any disclaimer, the term of this patent is extended or adjusted under 35 U.S.C. 154(b) by 127 days.

(21) Appl. No.: 18/153,057

(22) Filed: Jan. 11, 2023

(65) Prior Publication Data

US 2024/0235391 A1    Jul. 11, 2024

(51) Int. Cl.
 H02M 3/158    (2006.01)

(52) U.S. Cl.
 CPC ................................ H02M 3/158 (2013.01)

(58) Field of Classification Search
 CPC ................................................... H02M 3/158
 See application file for complete search history.

(56) References Cited

U.S. PATENT DOCUMENTS

| | | | |
|---|---|---|---|
| 9,342,400 B2 | 5/2016 | Nabhane et al. | |
| 10,256,812 B2 | 4/2019 | Leong et al. | |
| 10,439,597 B1 | 10/2019 | Yu et al. | |
| 2007/0210775 A1* | 9/2007 | Bothra | H02M 3/158 323/283 |
| 2008/0168281 A1* | 7/2008 | MacInnes | G06F 1/26 713/300 |
| 2012/0081086 A1* | 4/2012 | Van Dijk | H02M 3/158 323/273 |
| 2012/0084584 A1* | 4/2012 | Lee | G06F 1/3287 713/340 |
| 2015/0076906 A1 | 3/2015 | Tamegai et al. | |
| 2015/0188421 A1 | 7/2015 | Ko | |
| 2019/0280612 A1 | 9/2019 | Schulz et al. | |
| 2021/0367609 A1 | 11/2021 | Cherniak et al. | |
| 2022/0344949 A1* | 10/2022 | Morelli | H02J 7/007 |

FOREIGN PATENT DOCUMENTS

KR    10-2020-0007593 A    1/2020

OTHER PUBLICATIONS

International Search Report and Written Opinion in Appl. No. PCT/US2023/086265 mailed May 9, 2024, 8 pages.

* cited by examiner

*Primary Examiner* — Rafael O De Leon Domenech
(74) *Attorney, Agent, or Firm* — Kowert, Hood, Munyon, Rankin & Goetzel P.C.; Dean M. Munyon (57) ABSTRACT

A power management circuit for computer systems includes a power converter circuit that generates different voltage levels at different time periods. Multiple voltage regulator circuits are coupled to the output of the power converter circuit and to respective local power supply nodes. Switch devices are used to bypass the voltage regulator circuits during corresponding ones of the different time periods.

20 Claims, 9 Drawing Sheets

POWER CONVERTER CIRCUIT FOR USE WITH MULTIPLE LOW-CURRENT POWER RAILS

BACKGROUND

Technical Field

This disclosure relates to power management in computer systems and, more particularly, to power converter circuit operation.

Description of the Related Art

Modern computer systems may include multiple circuits blocks designed to perform various functions. For example, such circuit blocks may include processors and/or processor cores configured to execute software or program instructions. Additionally, the circuit blocks may include memory circuits, mixed-signal or analog circuits, and the like.

In some computer systems, the circuit blocks may be designed to operate at different power supply voltage levels. Power management circuits may be included in such computer systems to generate and monitor varying power supply voltage levels for the different circuit blocks.

Power management circuits often include one or more power converter circuits configured to generate regulated voltage levels on respective power supply signals using a voltage level of an input power supply signal. Such power converter circuits may employ multiple passive circuit elements such as inductors, capacitors, and the like.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed but, on the contrary, the intention is to cover all modifications, equivalents and alternatives falling within the spirit and scope of the appended claims.

DETAILED DESCRIPTION OF EMBODIMENTS

Different circuit blocks within a computer systems often require different power supply voltages. To generate such voltages, computer systems employ various combinations of power converter circuits and voltage regulator circuits. Depending on the current demands of the different circuit blocks within a computer system, a power converter circuit, a voltage regulator circuit, or a combination of the two, may be used to generate a particular regulated voltage level. Such power converter circuits can be implemented using a buck converter circuit which generates an output voltage less than its input voltage, a boost converter circuit which generates an output voltage greater than its input voltage, or a buck-boost converter circuit which generates an output voltage either greater than or less than its input voltage.

In some computer systems, power converter circuits may be located on dedicated integrated circuits referred to as "power management integrated circuits" (or "PMICs"). PMICs may include multiple voltage regulator circuits configured to generate regulated voltage levels for various power supply signals. In some cases, PMICs may also include passive circuit elements (e.g., inductors, capacitors, etc.) used by the voltage regulator and power converter circuits. In other cases, such passive circuit elements may be mounted on a common substrate or circuit board with the PMIC.

In cases where multiple different regulated voltage levels are needed for a computer system, a power converter circuit may be used in conjunction with multiple low-dropout (LDO) regulator circuits. The power converter circuit is set to provide a sufficiently large voltage that all of the LDO regulator circuits using the output of the power converter circuit can generate their respective voltage levels. Such an arrangement, however, can result in inefficiencies in cases where desired output voltages of one or more of the LDO regulator circuits are not close to the voltage generated by the power converter circuit. In such cases, an LDO circuit must reduce the voltage level generated by the power converter circuit to its desired level. The reduction can involve increasing the resistance between the power converter circuit output and a regulated power supply node, which results in additional power dissipation.

Another approach to generating different regulator voltage levels involves using multiple switches coupled between the output of a power converter circuit and respective power rails. This arrangement (referred to as "single inductor multiple output" or "SIMO") delivers packets of charge to each rail from the power converter circuit in a round robin fashion. While a SIMO implementation limits cross conduction between the rails, there is a period of time when a power rail is not connected to the output of the power converter circuit resulting in no charge being supplied to the power rail. If a load circuit coupled to the power rail begins to consume extra current during the time when the power rail is not connected to the output of the power converter circuit, the voltage level of the power rail could drop to an undesirable level.

To address the problems with the SIMO architecture, the switches, which are coupled between the output of the power converter circuit and respective power rails, are placed in parallel with LDO regulator circuits. The power converter circuit generates different voltage levels at different times. During each time period, a corresponding one of the switches is closed, allowing the power converter circuit to charge up the corresponding power rail. While this is happening, the LDO regulator circuits coupled to the other power rails are able to provide power to their corresponding rails.

The embodiments described herein employ switches coupled in parallel with regulator circuits to generate, from a single power converter circuit output, multiple regulated power supply voltage levels on corresponding power supply nodes. Varying the output voltage level of the power converter circuit, allows different power supply nodes to be charged at different times by the power converter circuit by bypassing the corresponding regulator circuits with the associated switches. Such an arrangement reduces the voltage level across the regulator circuits, thereby minimizing power dissipation and improving efficiency.

Figure 1:
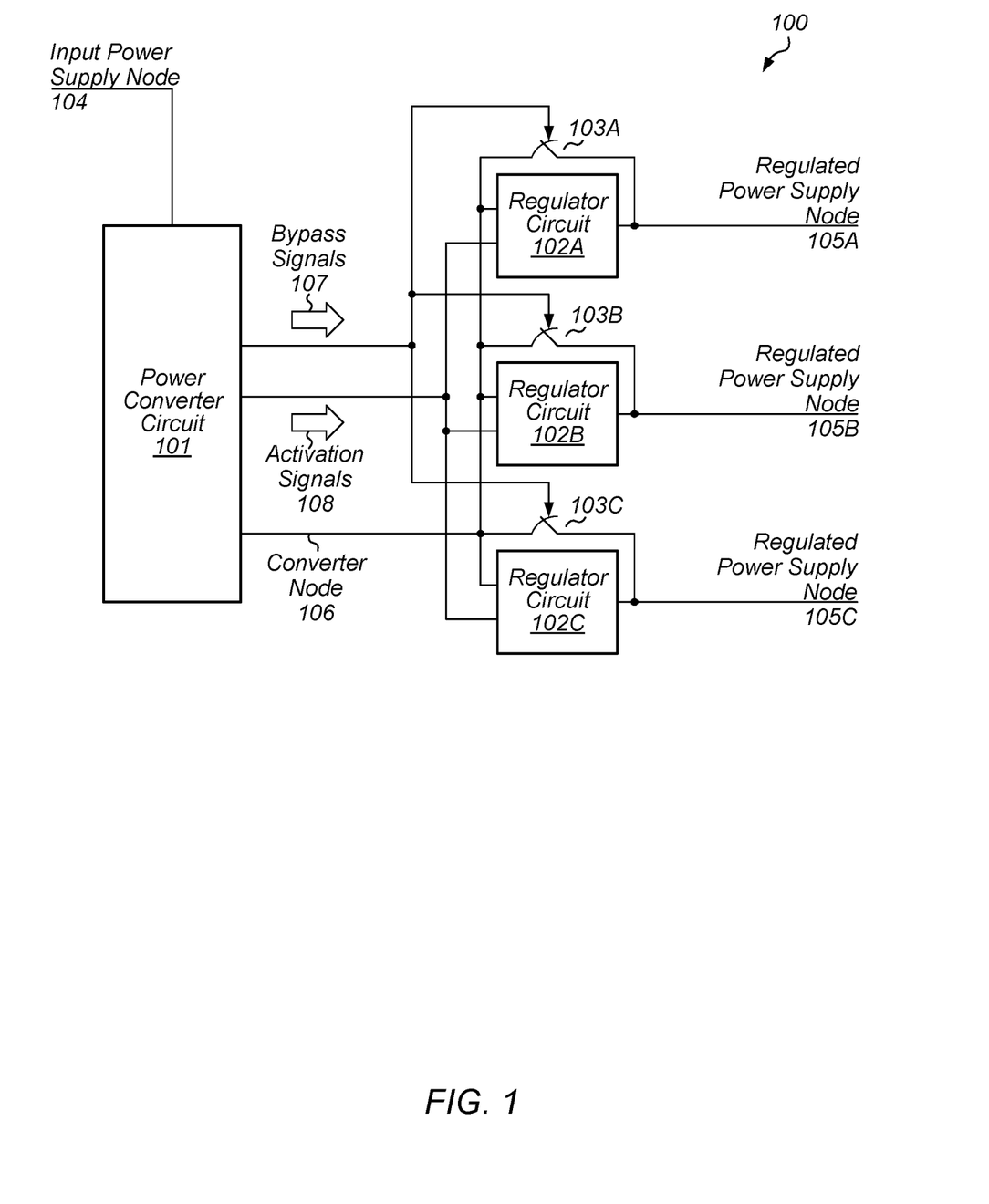
FIG. 1 is a block diagram of an embodiment of a power management circuit for a computer system.

A block diagram depicting an embodiment of a power converter circuit is illustrated in FIG. 1. As illustrated, power management circuit 100 includes power converter circuit 101, regulator circuits 102A-102C, and switches 103A-103C. It is noted that although only three voltage regulator circuits and three switches are depicted in the embodiment of FIG. 1, in other embodiments, any suitable number of regulator circuits and switches may be employed.

Power converter circuit 101 is configured to generate, using a voltage level of input power supply node 104, a plurality of voltage levels on converter node 106 during a plurality of time periods. As described below, power converter circuit 101 may be configured to adjust the duration of the plurality of time periods, as well as the order in which the plurality of voltage levels are generated, based on a variety of metrics. Power converter circuit 101 is further configured to generate bypass signals 107 and activation signals 108.

Regulator circuits 102A-102C are coupled to converter node 106 and configured to generate respective voltage levels on regulated power supply nodes 105A-105C using the voltage level of converter node 106. In various embodiments, regulator circuits 102A-102C are further configured to deactivate in response to a deactivation of corresponding ones of activation signals 108. In some cases, in response to a particular one of activation signals 108 being deactivated, a corresponding one of regulator circuits 102A-102C may decrease the resistance between its corresponding regulated power supply node and converter node 106.

As used herein, when a signal is activated, it is set to a logic or voltage level that activates a load circuit or device, and when a signal is deactivated, it is set to a logic or voltage level that deactivates the load circuit or device. The logic level may be either a high logic level or a low logic level depending on the load circuit. For example, an active state of a signal coupled to a p-channel MOSFET is a low logic level (referred to as an "active low signal"), while an active state of a signal coupled to an n-channel MOSFET is a high logic level (referred to as an "active high signal").

In various embodiments, regulator circuits 102A-102C may be implemented as LDO regulator circuits configured to adjust a resistance between converter node 106 and corresponding ones of regulated power supply nodes 105A-105C. The resistances are, in some embodiments, adjusted based on comparisons of the voltage levels of regulated power supply nodes 105A-105C to respective threshold voltages.

Switches 103A-103C are coupled between converter node 106 and corresponding ones of regulated power supply nodes 105A-105C. It is noted that regulated power supply nodes 105A-105C may be referred to as "local power supply nodes" as such nodes provide local power to a circuit block or group of circuit blocks included in a computer system. Each of switches 103A-103C is configured to bypass a corresponding regulator circuit of regulator circuits 102A-102C during a corresponding one of the plurality of time periods. To bypass the given regulator circuit, a corresponding one of bypass signals 107 is activated, closing a corresponding switch of the switches 103A-103C. When the corresponding switch is closed, a corresponding regulated power supply node of regulated power supply nodes 105A-105C is coupled to converter node 106, allowing power converter circuit 101 to source current to the corresponding regulated power supply node.

In various embodiments, switches 103A-103C may be implemented using one or more transistors. In some cases, switches 103A-103C may be implemented as pass-gate circuits that include at least one p-channel metal-oxide semiconductor field-effect transistor (MOSFET), fin field-effect transistor (FinFET), gate-all-around field-effect transistor (GAAFET), or any other suitable transconductance device, and one n-channel MOSFET, FinFET, GAAFET, or any other suitable transconductance device.

It is noted that power converter circuit 101 may be implemented as a buck converter circuit, a boost converter circuit, a buck-boost converter circuit, or any other suitable type of power converter circuit.

Figure 2:
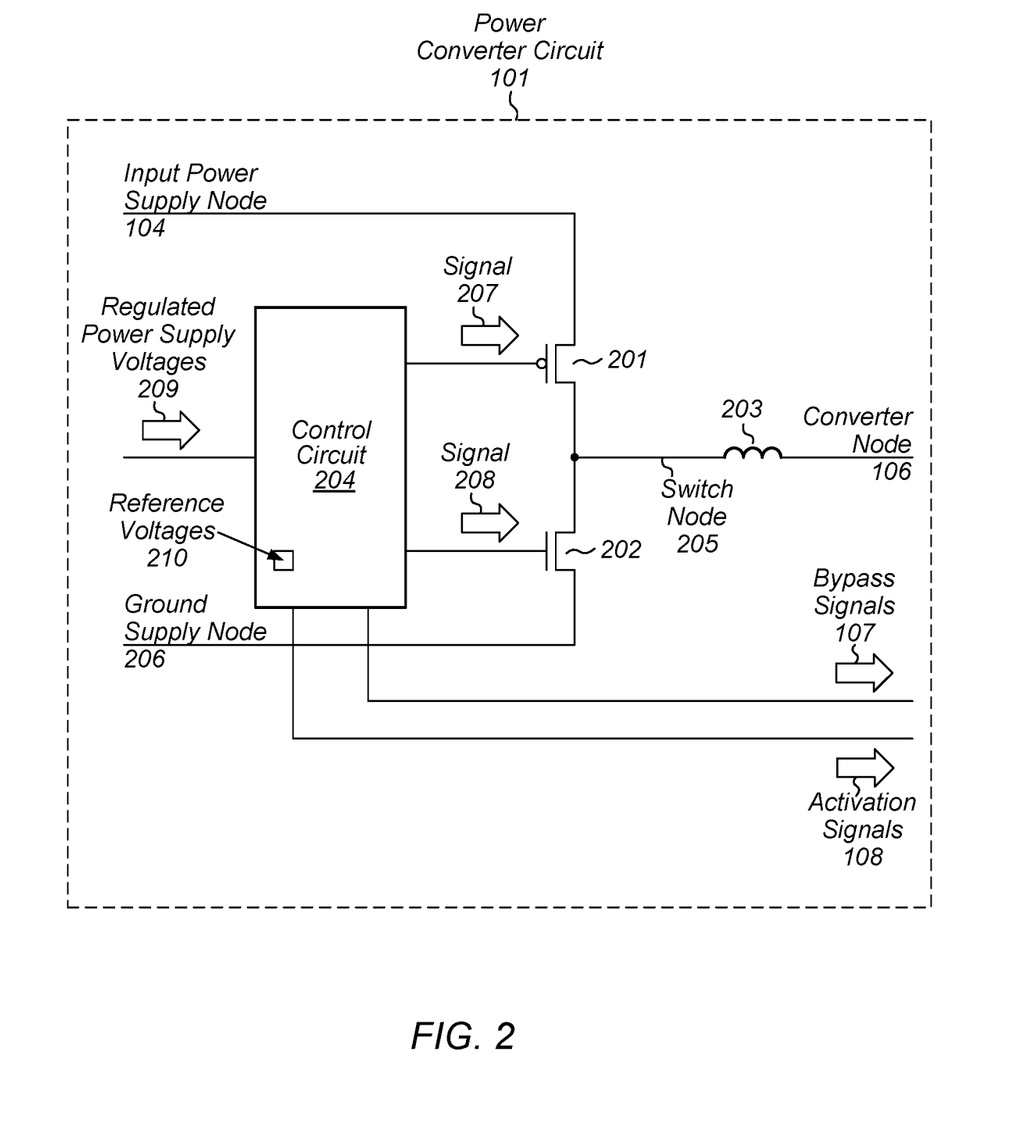
FIG. 2 is a block diagram of an embodiment of a power converter circuit included in a power management circuit.

Turning to FIG. 2, a block diagram of power converter circuit 101 is depicted. As illustrated, power converter circuit 101 includes transistors 201 and 202, inductor 203, and control circuit 204. It is noted that in the embodiment depicted in FIG. 2, power converter circuit 101 is implemented using a buck converter circuit topology and that, in other embodiments, other circuit topologies (e.g., a boost converter circuit topology or a buck-boost converter circuit topology) are possible and contemplated.

Transistor 201 is coupled between input power supply node 104 and switch node 205, and is controlled by signal 207. Transistor 202 is coupled between switch node 205 and ground supply node 206, and is controlled by signal 208. Switch node 205 is coupled to converter node 106 via inductor 203.

Control circuit 204 is configured to generate signals 207 and 208 using regulated supply voltages node 209 and reference voltages 210. During a particular time period, control circuit 204 is configured to perform a comparison of a particular one of regulated power supply voltages 209 to a corresponding one of reference voltages 210. Using a result of the comparison, control circuit 204 is configured to activate and deactivate signals 207 and 208 to control transistors 201 and 202. Control circuit 204 is also configured to generate bypass signals 107 and activation signals 108 in order to activate a particular one of regulator circuits 102A-102C, while bypassing the inactive ones of regulator circuits 102A-102C. In various embodiments, regulated power supply voltage 209 may correspond to respective voltage levels of regulated power supply nodes 105A-105C.

During a different time period, control circuit 204 is configured to perform a comparison of a different one of regulated power supply voltages 209. As in the particular time period, control circuit 204 is configured to activate and deactivate signals 207 and 208 using results of the comparison. In the different time period, control circuit 204 is configured to activate different ones of bypass signals 107 and activation signals 108. It is noted that although only two time periods are described, in various embodiments, control circuit 204 may cycle through many time periods depending on a number of voltage regulator circuits included in the power management circuit.

The respective durations of the various time periods employed by control circuit 204 may, in various embodiments, be equal. In other embodiments, control circuit 204 may adjust a duration of a given time period based on the respective values of regulated power supply voltages 209. For example, if a given one of regulated power supply voltages 209 falls below a minimum threshold value, control circuit 204 may terminate a current time period in order to adjust the value of converter node 106 to a voltage level needed by the voltage regulator circuit coupled to one of regulated power supply nodes 105A-105C with the low voltage. Alternatively, control circuit 204 may terminate adjust the duration of a given time period in response to a determination that a current being drawn from a given one of regulated power supply nodes 105A-105C exceeds a maximum threshold value.

Control circuit 204 may, in various embodiments, be configured to cycle through the different regulated power supply voltages 209 according to a predetermined algorithm. Alternatively, in other embodiments, control circuit 204 may adjust the sequence in which it uses different ones of regulated power supply voltages 209 based on the values of regulated power supply voltages 209, levels of activity of circuit blocks using corresponding ones of regulated power supply voltages 209, or any other suitable metric.

To activate and deactivate signals 207 and 208, control circuit 204 is further configured to activate signal 207 and deactivate signal 208 at the beginning of the particular time period. In response to an activation of signal 207, transistor 201 is configured to couple switch node 205 to input power supply node 104, allowing switch node 205 to increase in voltage. As the voltage level of switch node 205 increases, current flows from input power supply node 104, through switch node 205 and inductor 203 into converter node 106. As the current flows through inductor 203, the magnetic field of inductor 203 increases, magnetizing the inductor.

Based on the results of the comparison of a particular one of regulated power supply voltages 209 to a corresponding one of reference voltages 210, control circuit 204 may be further configured to deactivate signal 207 and activate signal 208. In response to the deactivation of signal 207, transistor 201 decouples switch node 205 from input power supply node 104 while, in response to the activation of signal 208, transistor 202 couples switch node 205 to ground supply node 206, resulting in the discharge of switch node 205. As the voltage level of switch node 205 decreases, the magnetic field of inductor 203 collapses, de-magnetizing inductor 203. As inductor 203 is de-magnetized, current continues to flow into converter node 106 using the energy stored in the magnetic field of inductor 203.

It is noted that, in some embodiments, inductor 203 may be located on a same integrated circuit as control circuit 204 and transistors 201 and 202 while, in other embodiments, inductor 203 may be located on a different integrated circuit than control circuit 204 and transistors 201 and 202.

Control circuit 204 may, in various embodiments, be implemented using one or more voltage reference circuits, and one or more analog comparator circuits. Additionally, control circuit 204 may be implemented using any suitable combination of combinatorial and sequential logic circuits.

In various embodiments, transistor 201 may be implemented as a p-channel MOSFET, FinFET, GAAFET, or any other suitable transconductance device, while transistor 202 may be implemented as an n-channel MOSFET, FinFET, GAAFET, or any other suitable type of transconductance device. It is noted that although transistors 201 and 202 are depicted as single transistors, in other embodiments, transistors 201 and 202 may be implemented using multiple transistors coupled in parallel.

Figure 3:
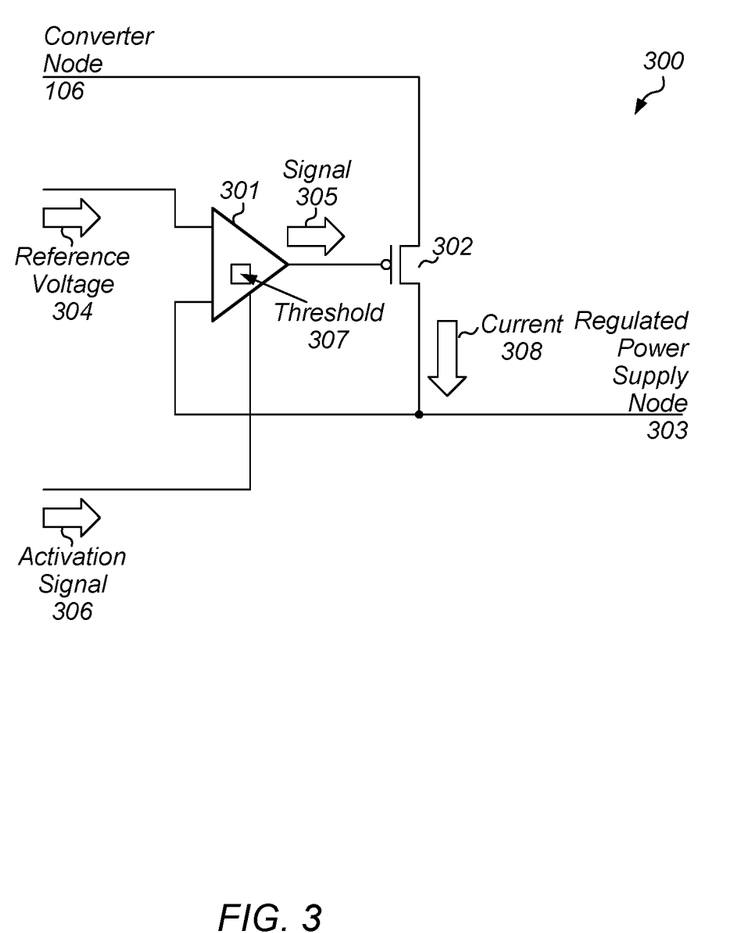
FIG. 3 is a block diagram of an embodiment of a low-dropout voltage regulator circuit included in a power management circuit.

Turning to FIG. 3, a block diagram of an embodiment of a voltage regulator circuit is depicted. It is noted that, in various embodiments, voltage regulator circuit 300 may correspond to any of regulator circuits 102A-102C. As illustrated, voltage regulator circuit 300 includes comparator circuit 301 and transistor 302.

Comparator circuit 301 is configured to generate signal 305 based on reference voltage 304 and regulated power supply node 303. In various embodiments, regulated power supply node 303 may correspond to any of regulated power supply nodes 105A-105C, and reference voltage 304 may correspond to a desired voltage level for regulated power supply node 303.

In some embodiments, to generate signal 305, comparator circuit 301 may be further configured to perform a comparison of respective voltage levels of reference voltage 304 and regulated power supply node 303, and determine a voltage level of signal 305 based on results of the comparison. For example, in some embodiments, comparator circuit 301 may be configured to decrease the voltage level of signal 305 as the difference between reference voltage 304 and the voltage level of regulated power supply node 303 increases.

As described below, the voltage level of signal 305 adjusts the conductance of transistor 302. Changing the conductance of transistor 302 affects the amount of current flowing from converter node 106 into regulated power supply node 303, which, in turn, adjusts the voltage level of regulated power supply node 303. By adjusting the voltage level of signal 305 as described above, the conductance between converter node 106 and regulated power supply node 303 can be adjusted to maintain the voltage level of regulated power supply node 303 at a desired level, e.g., the level of reference voltage 304.

The operation of comparator circuit 301 can also be based on activation signal 306. It is noted that activation signal 306 may, in various embodiments, correspond to any of activation signals 108. Comparator circuit 301 may be configured to generate signal 305 in response to an activation of activation signal 306. In response to a deactivation of activation signal 306, comparator circuit 301 may be configured to set the voltage level of signal 305 such that transistor 302 is inactive, thereby de-coupling regulated power supply node 303 from converter node 106.

In some embodiments, comparator circuit 301 may also be configured to compare a difference between reference voltage 304 and the voltage level of regulated power supply node 303 to threshold 307. In response to a determination that the difference between reference voltage 304 and the voltage level of regulated power supply node 303 is less than threshold 307, comparator circuit 301 may adjust the voltage level of signal 305 in order to fully activate transistor 302, thereby reducing the resistance between converter node 106 and regulated power supply node 303 to a value corresponding to the on-resistance of transistor 302.

Comparator circuit 301 may, in various embodiments, be implemented as a differential amplifier circuit, or any other suitable comparator circuit configured to generate an output signal whose voltage level is proportional to a difference between at least two voltage levels.

Transistor 302 is coupled between converter node 106 and regulated power supply node 303, and is controlled by signal 305. Transistor 302 is configured to source current 308 to regulated power supply node 303 based on a voltage level of signal 305. In various embodiments, transistor 302 may be implemented as a p-channel MOSFET, FinFET, GAAFET, or any other suitable transconductance device. It is noted that although transistor 302 is depicted as a single transistor, in other embodiments, transistor 302 may be implemented using multiple transistors coupled together in parallel.

In response to changes in a voltage level of signal 305, transistor 302 is configured to adjust a conductance between converter node 106 and regulated power supply node 303. For example, in cases where transistor 302 is implemented as a p-channel MOSFET, FinFET, or GAAFET, as the voltage level of signal 305 decreases, transistor 302 increases the conductance between converter node 106 and regulated power supply node 303.

Figure 4:
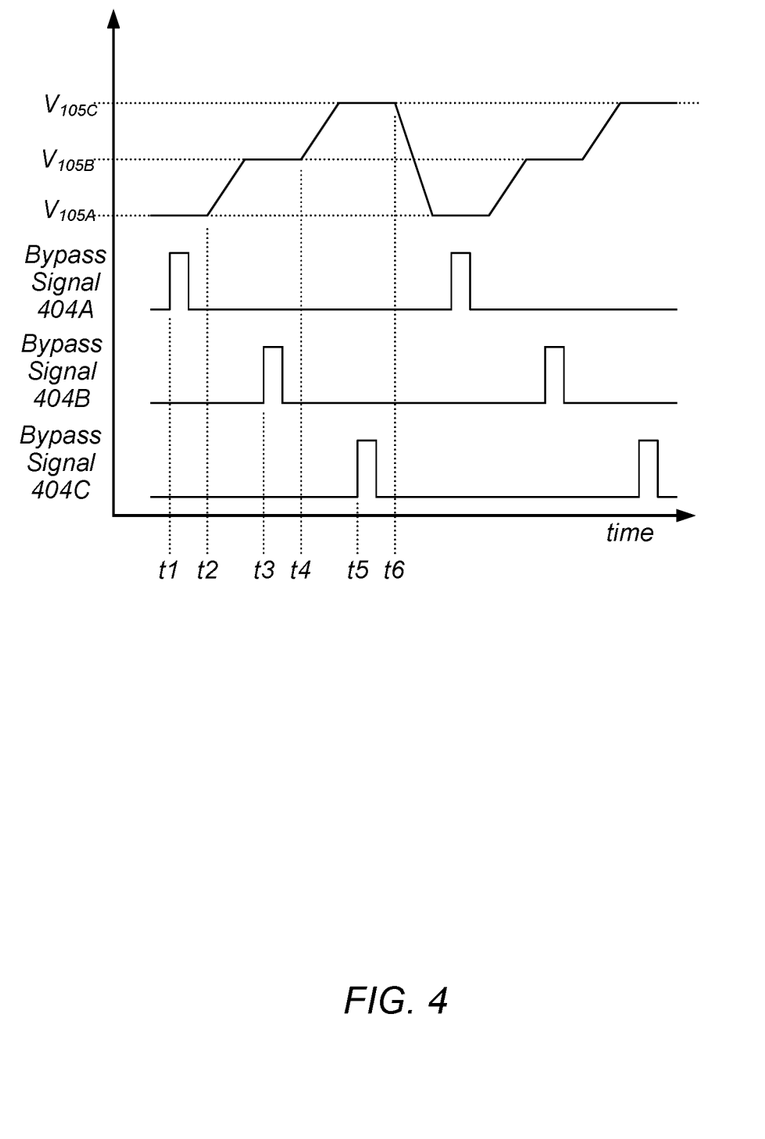
FIG. 4 illustrates example waveforms associated with a power management circuit.

Turning to FIG. 4, example waveforms associated with operating a power management circuit are illustrated. It is noted that, in various embodiments, bypass signals 404A-404C may be included in bypass signals 107 and that bypass signal 404A may control switch 103A, bypass signal 404B may control switch 103B, and bypass signal 404C may control switch 103C. Moreover, $V_{105A}$ may correspond to a voltage level of regulated power supply node 105A, $V_{105B}$ may correspond to a voltage level of regulated power supply node 105B, and $V_{105C}$ may correspond to a voltage level of regulated power supply node 105C.

At time t1, power converter circuit 101 has previously set the voltage level of converter node 106 to $V_{105A}$, and bypass signal 404A is activated. With the activation of bypass signal 404A, switch 103A is closed, bypassing regulator circuit 102A, and coupling regulated power supply node 105A to converter node 106. As described above, the duration of the activation of bypass signal 404A may be determined using a variety of techniques.

At time t2, power converter circuit 101 transitions the voltage level of converter node 106 from $V_{105A}$ to $V_{105B}$. Once the transition is complete at time t3, bypass signal 404B is activated, bypassing voltage regulator circuit 102B, and coupling regulated power supply node 105B to converter node 106.

At time t4, power converter circuit 101 transitions the voltage level of converter node 106 from $V_{105B}$ to $V_{105C}$. Once the transition is complete at time t5, bypass signal 404C is activated, bypassing voltage regulator circuit 102C, and coupling regulated power supply node 105C to converter node 106.

At time t6, power converter circuit 101 transitions the voltage level of converter node 106 from $V_{105C}$ to $V_{105A}$, and the cycle repeats. As noted above, the cycle may be altered based on current demand from the various regulated power supply nodes.

To summarize, various embodiments of a power management circuit are disclosed. Broadly speaking, an apparatus is contemplated in which a power converter circuit may be configured to generate a plurality of voltage levels on a converter node during a plurality of time periods. A plurality of voltage regulator circuits coupled to the converter node may be configured to generate respective voltage levels on a plurality of local power supply nodes using a voltage level of the converter node. A plurality of switch devices are coupled between the converter node and corresponding local power supply nodes of the plurality of local power supply nodes. A given switch device of the plurality of switch devices may be configured to bypass a given voltage regulator circuit of the plurality of voltage regulator circuits during a given time period of the plurality of time periods.

Figure 5:
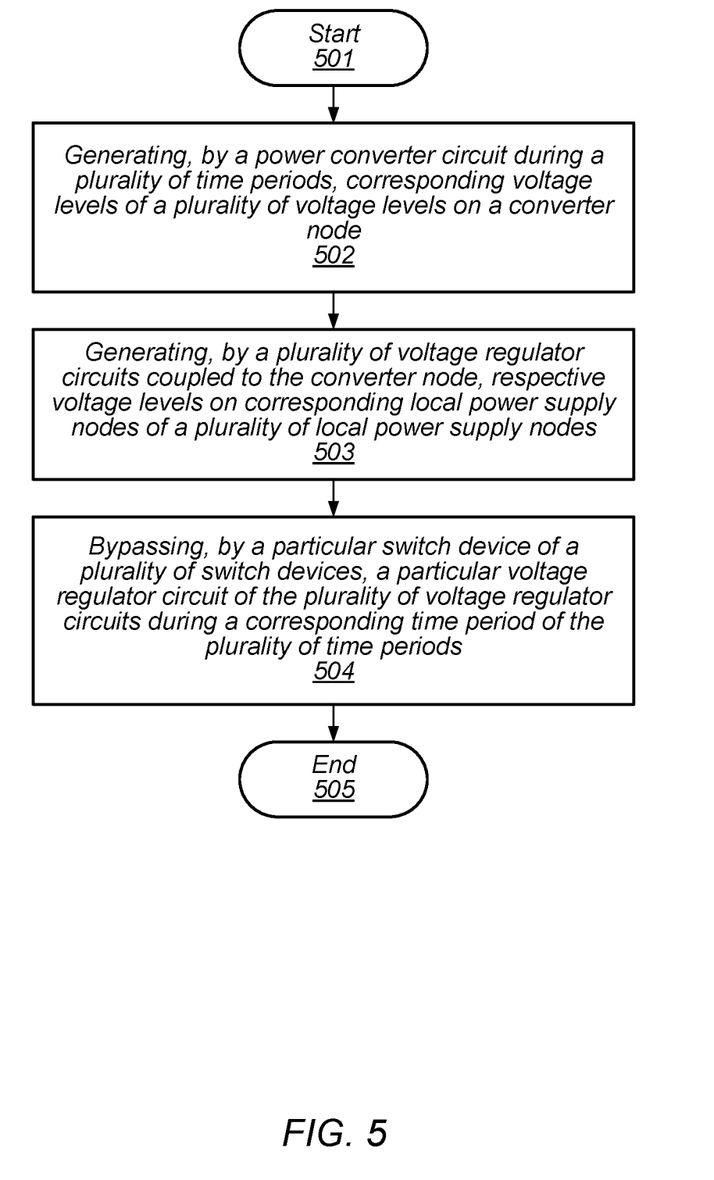
FIG. 5 is a flow diagram depicting an embodiment of a method for operating a power management circuit.

Turning to FIG. 5, a flow diagram depicting an embodiment of a method for operating a power management circuit is illustrated. The method, which may be applied to various power management circuits, e.g., power management circuit 100, begins in block 501.

The method includes generating, by a power converter circuit during a plurality of time periods, corresponding voltage levels of a plurality of voltage levels on a converter node (block 502). In various embodiments, the method may also include determining respective durations of the plurality of time periods according to a particular algorithm of a plurality of algorithms. In other embodiments, the method may further include selecting the particular algorithm based on operational information of a computer system.

The method further includes generating, by a plurality of voltage regulator circuits coupled to the converter node, respective voltage levels on corresponding local power supply nodes of a plurality of local power supply nodes (block 503). In some embodiments, a given voltage regulator circuit of the plurality of voltage regulator circuits includes a low-dropout voltage regulator circuit. In such cases, the method may also include coupling, by the given voltage circuit, a given local power supply node of the plurality of local power supply nodes to the converter node in response to a difference between a voltage level of the converter node and a voltage level of the given local power supply node being less than a threshold value.

The method also includes bypassing, by a particular switch device of a plurality of switch devices, a particular voltage regulator circuit of the plurality of voltage regulator circuits during a corresponding time period of the plurality of time periods (block 504).

In various embodiments, the method may further include modifying respective durations of the plurality of time periods based on a load current drawn from the converter node. In other embodiments, the method may also include, in response to determining that the respective durations of the plurality of time periods are greater than the respective threshold values, generating, by the power converter circuit, a largest voltage level of the plurality of voltage levels on the converter node, and activating, in parallel, the plurality of voltage regulator circuits. The method concludes in block 505.

Figure 6:
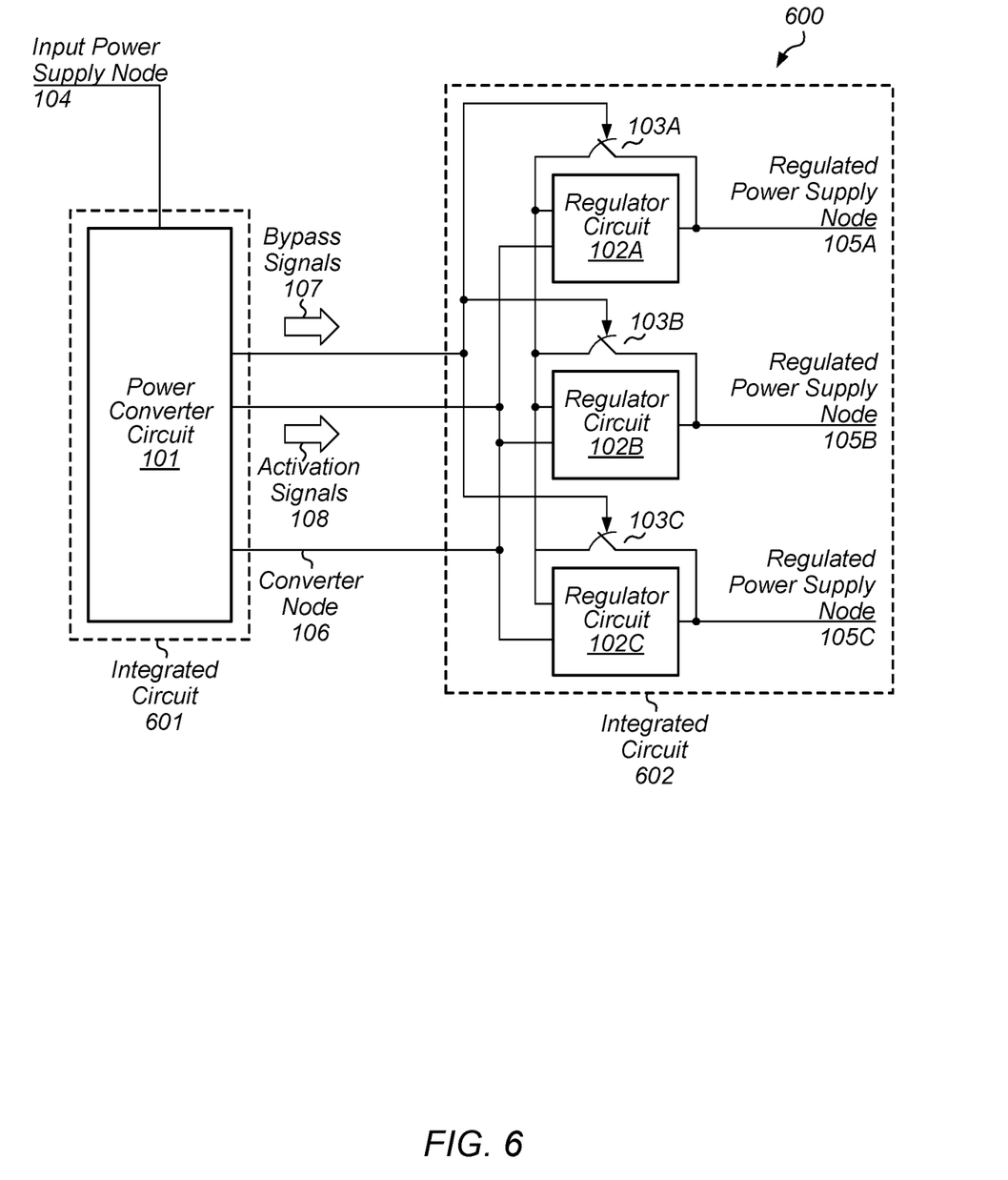
FIG. 6 is a block diagram of a different embodiment of a power management circuit.

In some cases, different portions of a power management circuit may be located on different integrated circuits included in a computer system. A block diagram of a power management circuit implemented with multiple integrated circuits is depicted in FIG. 6.

As illustrated, power management circuit 600 includes integrated circuit 601 and integrated circuit 602. In various embodiments, integrated circuit 601 and integrated circuit 602 may be mounted on a common substrate, circuit board, or other suitable surface. It is noted that bypass signals 107 and activation signals 108 may be transmitted via conductive traces on the common substrate or circuit board. It is further noted that converter node 106 may also be implemented as a conductive trace on the common substrate or circuit board.

Integrated circuit 601 includes power converter circuit 101, which is configured to generate bypass signals 107 and activation signals 108, and is configured to generate different voltage levels at different times on converter node 106 as described above. Although integrated circuit 601 is depicted as including only power converter circuit 101, in other embodiments, additional circuit blocks, e.g., voltage reference circuits, other power converter circuits, passive circuit elements, and the like, may be included in integrated circuit 601.

Integrated circuit 602 includes regulator circuits 102A-102C and switches 103A-103C. In various embodiments, regulator circuit 102A-102C, and switches 103A-103C are configured to perform operations similar to that described above in regard to FIG. 1. Although integrated circuit 602 is depicted as only including regulator circuits 102A-102C, and switches 103A-103C, in other embodiments, additional circuit blocks may be included in integrated circuit 602. For example, in some embodiments, integrated circuit 602 may be a system-on-a-chip (SoC) such as SoC 700 and include processor circuits, memory circuits, input/output circuits, and the like.

Although power management circuit 600 is depicted as using two integrated circuits, in other embodiments, any suitable number of integrated circuits may be employed. For example, in some embodiments, first subsets of regulator circuits 102A-102C and switches 103A-103C may be located on a first integrated circuit, while second subsets of regulator circuits 102A-102C and switches 103A-103C may be located on a second integrated circuit.

Figure 7:
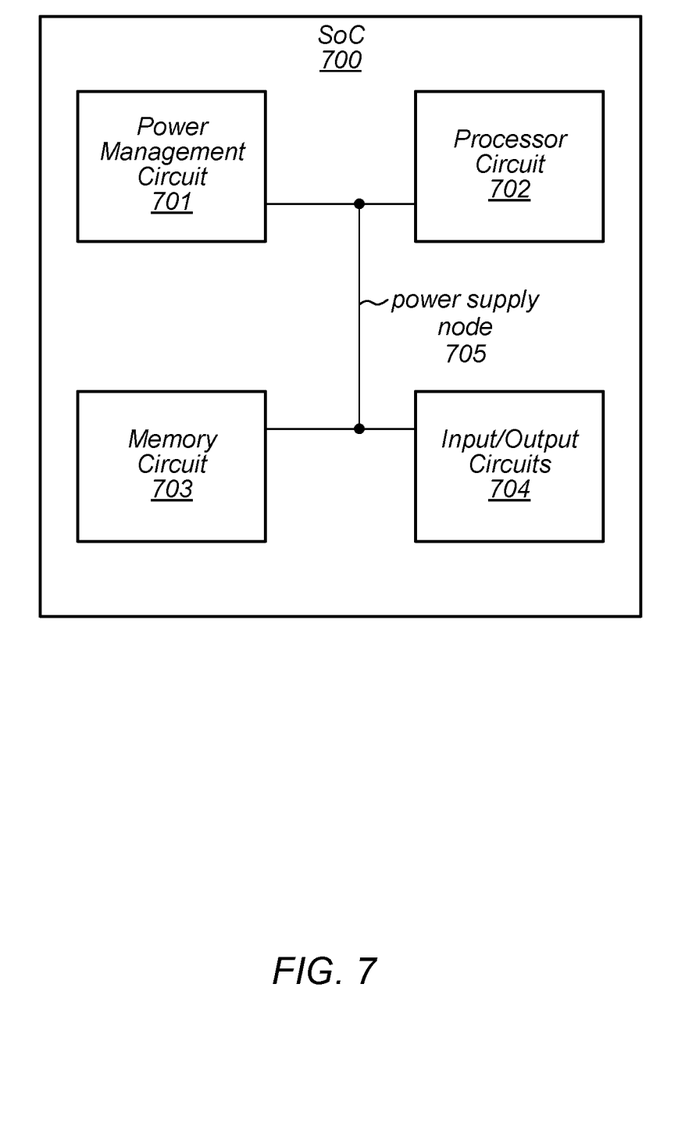
FIG. 7 is a block diagram of one embodiment of a system-on-a-chip that includes a power management circuit.

A block diagram of a SoC is illustrated in FIG. 7. In the illustrated embodiment, SoC 700 includes power management circuit 701, processor circuit 702, input/output circuits 704, and memory circuit 703, each of which is coupled to power supply node 705. In various embodiments, SoC 700 may be configured for use in a desktop computer, server, or in a mobile computing application such as, e.g., a tablet, laptop computer, or wearable computing device.

In various embodiments, power management circuit 701 may correspond to power management circuit 100 as depicted in FIG. 1. In such cases, power supply node 705 may correspond to one of regulated power supply nodes 105A-105C. Although power management circuit 701 is depicted as generating a voltage on a single power supply node, in other embodiments, power management circuit 701 may be configured to generate respective voltages on any suitable number of power supply nodes.

Processor circuit 702 may, in various embodiments, be representative of a general-purpose processor that performs computational operations. For example, processor circuit 702 may be a central processing unit (CPU) such as a microprocessor, a microcontroller, an application-specific integrated circuit (ASIC), or a field-programmable gate array (FPGA).

Memory circuit 703 may, in various embodiments, include any suitable type of memory such as a Dynamic Random-Access Memory (DRAM), a Static Random-Access Memory (SRAM), a Read-Only Memory (ROM), an Electrically Erasable Programmable Read-only Memory (EEPROM), or a non-volatile memory, for example. It is noted that although a single memory circuit is illustrated in FIG. 7, in other embodiments, any suitable number of memory circuits may be employed.

Input/output circuits 704 may be configured to coordinate data transfer between SoC 700 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 704 may be configured to implement a version of Universal Serial Bus (USB) protocol or IEEE 1394 (Firewire®) protocol.

Input/output circuits 704 may also be configured to coordinate data transfer between SoC 700 and one or more devices (e.g., other computing systems or integrated circuits) coupled to SoC 700 via a network. In one embodiment, input/output circuits 704 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 704 may be configured to implement multiple discrete network interface ports.

Figure 8:
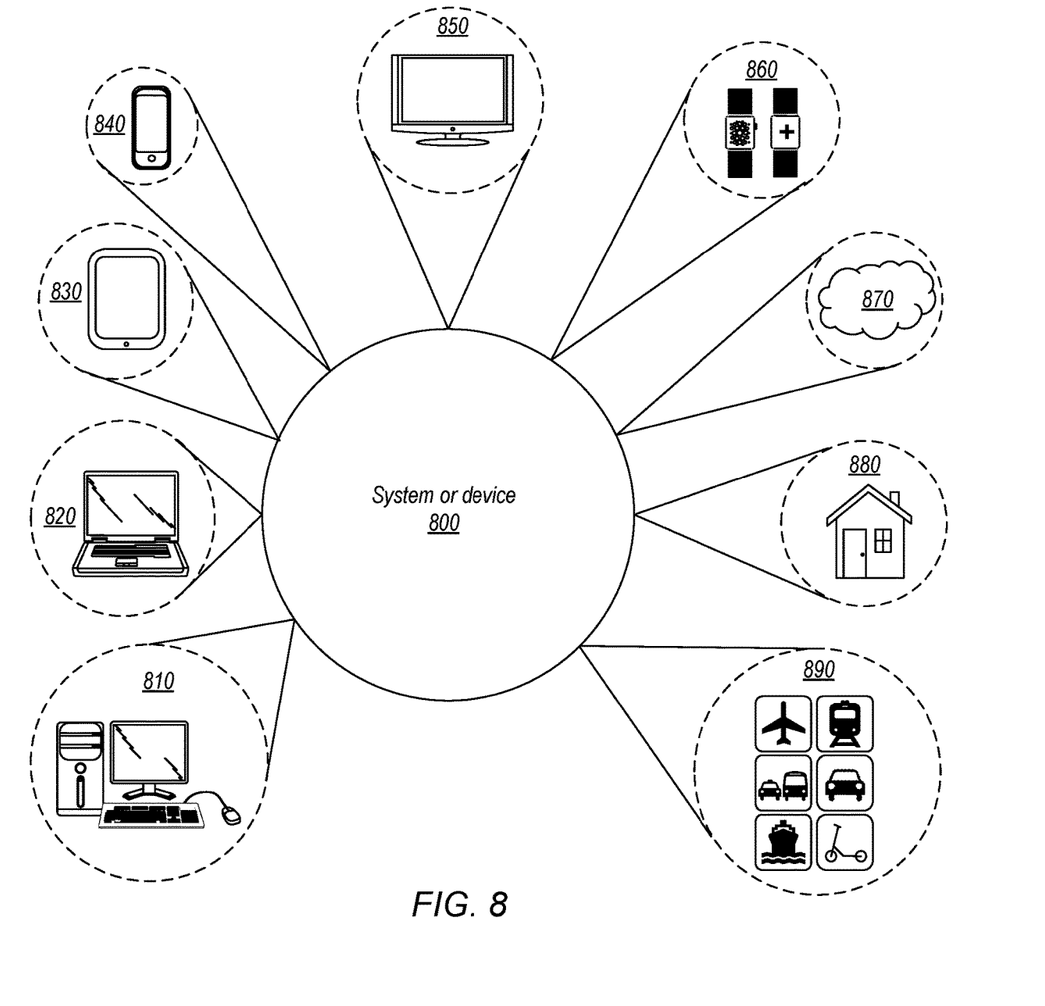
FIG. 8 is a block diagram of various embodiments of computer systems that may include power management circuits.

Turning now to FIG. 8, various types of systems that may include any of the circuits, devices, or systems discussed above are illustrated. System or device 800, which may incorporate or otherwise utilize one or more of the techniques described herein, may be utilized in a wide range of areas. For example, system or device 800 may be utilized as part of the hardware of systems such as a desktop computer 810, laptop computer 820, tablet computer 830, cellular or mobile phone 840, or television 850 (or set-top box coupled to a television).

Similarly, disclosed elements may be utilized in a wearable device 860, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 800 may also be used in various other contexts. For example, system or device 800 may be utilized in the context of a server computer system, such as a dedicated server or on shared hardware that implements a cloud-based service 870. Still further, system or device 800 may be implemented in a wide range of specialized everyday devices, including devices 880 commonly found in the home such as refrigerators, thermostats, security cameras, etc. The interconnection of such devices is often referred to as the "Internet of Things" (IoT). Elements may also be implemented in various modes of transportation. For example, system or device 800 could be employed in the control systems, guidance systems, entertainment systems, etc. of various types of vehicles 890.

The applications illustrated in FIG. 8 are merely exemplary and are not intended to limit the potential future applications of disclosed systems or devices. Other example applications include, without limitation: portable gaming devices, music players, data storage devices, unmanned aerial vehicles, etc.

Figure 9:
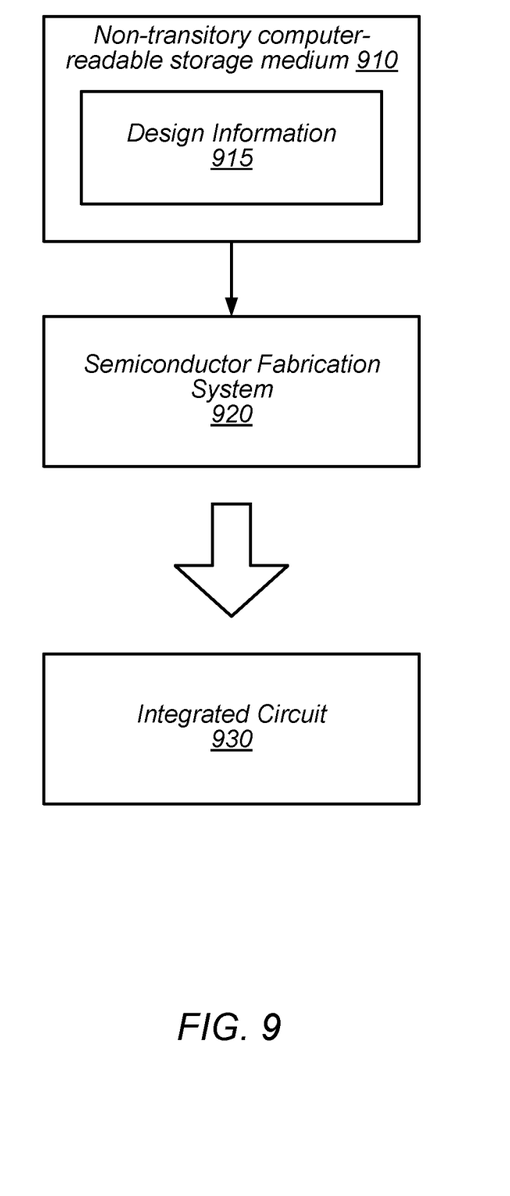
FIG. 9 illustrates an example of a non-transitory computer-readable storage medium that stores circuit design information.

FIG. 9 is a block diagram illustrating an example of a non-transitory computer-readable storage medium that stores circuit design information, according to some embodiments. In the illustrated embodiment, semiconductor fabrication system 920 is configured to process design information 915 stored on non-transitory computer-readable storage medium 910 and fabricate integrated circuit 930 based on design information 915.

Non-transitory computer-readable storage medium 910 may comprise any of various appropriate types of memory devices or storage devices. Non-transitory computer-readable storage medium 910 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as Flash, magnetic media, e.g., a hard drive, or optical storage; registers, or other similar types of memory elements, etc. Non-transitory computer-readable storage medium 910 may include other types of non-transitory memory as well or combinations thereof. Non-transitory computer-readable storage medium 910 may include two or more memory mediums, which may reside in different locations, e.g., in different computer systems that are connected over a network.

Design information 915 may be specified using any of various appropriate computer languages, including hardware description languages such as, without limitation: VHDL, Verilog, SystemC, SystemVerilog, RHDL, M, MyHDL, etc. Design information 915 may be usable by semiconductor fabrication system 920 to fabricate at least a portion of integrated circuit 930. The format of design information 915 may be recognized by at least one semiconductor fabrication system, such as semiconductor fabrication system 920, for example. In some embodiments, design information 915 may include a netlist that specifies elements of a cell library, as well as their connectivity. One or more cell libraries used during logic synthesis of circuits included in integrated circuit 930 may also be included in design information 915. Such cell libraries may include information indicative of device or transistor-level netlists, mask design data, characterization data, and the like, of cells included in the cell library.

Integrated circuit 930 may, in various embodiments, include one or more custom macrocells, such as memories, analog or mixed-signal circuits, and the like. In such cases, design information 915 may include information related to included macrocells. Such information may include, without limitation, schematics capture database, mask design data, behavioral models, and device or transistor-level netlists. As used herein, mask design data may be formatted according to graphic data system (GDSII), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements shown or described herein. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third," when applied to a particular feature, do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. An apparatus, comprising:
   a power converter circuit configured to generate a plurality of voltage levels on a converter node during a plurality of time periods;
   a plurality of voltage regulator circuits coupled to the converter node and configured to generate respective voltage levels on a plurality of local power supply nodes using a voltage level of the converter node; and
   a plurality of switch devices coupled between the converter node and corresponding local power supply nodes of the plurality of local power supply nodes, wherein a given switch device of the plurality of switch devices is configured to bypass a given voltage regulator circuit of the plurality of voltage regulator circuits during a given time period of the plurality of time periods.

2. The apparatus of claim 1, wherein to bypass the given voltage regulator circuit, the given switch device is further configured to couple the converter node to a given local power supply node coupled to the given voltage regulator circuit.

3. The apparatus of claim 1, wherein the power converter circuit is further configured to:
   modify respective durations of the plurality of time periods based on a load current drawn from the converter node;
   in response to a determination that at least one of the respective voltage levels on the plurality of local power supply nodes is less than a threshold value:
      generate a largest voltage level of the plurality of voltage levels on the converter node; and
      activate, in parallel, the plurality of voltage regulator circuits.

4. The apparatus of claim 3, wherein the given voltage regulator circuit includes a low-dropout voltage regulator circuit coupled to a given local power supply node of the plurality of local power supply nodes, and wherein the given voltage regulator circuit is configured to couple the given local power supply node to the converter node in response to a determination that a difference between a voltage level of the converter node and a voltage level of the given local power supply node is less than a threshold value.

5. The apparatus of claim 1, wherein the power converter circuit is further configured to determine respective durations of the plurality of time periods according to a particular algorithm of a plurality of algorithms.

6. The apparatus of claim 1, wherein the power converter circuit is further configured to start a particular time period of the plurality of time periods in response to receiving an interrupt signal.

7. A method, comprising:
   generating, by a power converter circuit during a plurality of time periods, corresponding voltage levels of a plurality of voltage levels on a converter node;
   generating, by a plurality of voltage regulator circuits coupled to the converter node, respective voltage levels on corresponding local power supply nodes of a plurality of local power supply nodes; and
   bypassing, by a particular switch device of a plurality of switch devices, a particular voltage regulator circuit of the plurality of voltage regulator circuits during a corresponding time period of the plurality of time periods.

8. The method of claim 7, further comprising:
modifying respective durations of the plurality of time periods based on a load current drawn from the converter node;
in response to determining that that at least one of the respective voltage levels on the plurality of local power supply nodes is less than a threshold value:
generating, by the power converter circuit, a largest voltage level of the plurality of voltage levels on the converter node; and
activating, in parallel, the plurality of voltage regulator circuits.

9. The method of claim 7, wherein a given voltage regulator circuit of the plurality of voltage regulator circuits includes a low-dropout voltage regulator circuit, and further comprising coupling, by the given voltage regulator circuit, a given local power supply node of the plurality of local power supply nodes to the converter node in response to a determination that a difference between a voltage level of the converter node and a voltage level of the given local power supply node is less than a threshold value.

10. The method of claim 7, further comprising determining respective durations of the plurality of time periods according to a particular algorithm of a plurality of algorithms.

11. The method of claim 10, further comprising selecting the particular algorithm based on operational information of a computer system.

12. The method of claim 7, further comprising, starting a particular time period of the plurality of time periods in response to receiving an interrupt signal.

13. The method of claim 7, wherein the power converter circuit is included on a first integrated circuit, and wherein the plurality of voltage regulator circuits and the plurality of switch devices are included on a second integrated circuit.

14. An apparatus, comprising:
a first integrated circuit including a power converter circuit configured to generate a plurality of voltage levels on a converter node during a plurality of time periods; and
a second integrated circuit including:
a plurality of voltage regulator circuits coupled to the converter node and configured to generate respective voltage levels on a plurality of local power supply nodes using a voltage level of the converter node; and
a plurality of switch devices coupled between the converter node and corresponding local power supply nodes of the plurality of local power supply nodes, wherein a given switch device of the plurality of switch devices is configured to bypass a given voltage regulator circuit of the plurality of voltage regulator circuits during a given time period of the plurality of time periods.

15. The apparatus of claim 14, wherein the first integrated circuit and the second integrated circuit are mounted to a common substrate, and wherein the power converter circuit is coupled to the converter node via an inductor mounted on the common substrate.

16. The apparatus of claim 14, wherein to bypass the given voltage regulator circuit, the given switch device is further configured to couple the converter node to a given local power supply node coupled to the given voltage regulator circuit.

17. The apparatus of claim 14, wherein the power converter circuit is further configured to:
modify respective durations of the plurality of time periods based on a load current drawn from the converter node;
in response to a determination that the respective durations of the plurality of time periods are larger than respective threshold values:
generate a largest voltage level of the plurality of voltage levels on the converter node; and
activate, in parallel, the plurality of voltage regulator circuits.

18. The apparatus of claim 14, wherein the given voltage regulator circuit includes a low-dropout voltage regulator circuit coupled to a given local power supply node of the plurality of local power supply nodes, and wherein the given voltage regulator circuit is configured to couple the given local power supply node to the converter node in response to a determination that a difference between a voltage level of the converter node and a voltage level of the given local power supply node is less than a threshold value.

19. The apparatus of claim 14, wherein the power converter circuit is further configured to determine respective durations of the plurality of time periods according to a particular algorithm of a plurality of algorithms.

20. The apparatus of claim 14, wherein the power converter circuit is further configured to start a particular time period of the plurality of time periods in response to receiving an interrupt signal.

* * * * *